(12) United States Patent
Kecht et al.

(10) Patent No.: US 8,871,299 B2
(45) Date of Patent: Oct. 28, 2014

(54) SOLID PARTICLES HAVING A SILICATE COATING

(75) Inventors: Johann Kecht, Munich (DE); Stephan Steinlein, Munich (DE)

(73) Assignee: Giesecke & Devrient GmbH, Munich (DE)

( * ) Notice: Subject to any disclaimer, the term of this patent is extended or adjusted under 35 U.S.C. 154(b) by 21 days.

(21) Appl. No.: 13/513,254

(22) PCT Filed: Nov. 30, 2010

(86) PCT No.: PCT/EP2010/007264
§ 371 (c)(1),
(2), (4) Date: Jun. 1, 2012

(87) PCT Pub. No.: WO2011/066948
PCT Pub. Date: Jun. 9, 2011

(65) Prior Publication Data
US 2012/0237668 A1 Sep. 20, 2012

(30) Foreign Application Priority Data
Dec. 2, 2009 (DE) .......................... 10 2009 056 634

(51) Int. Cl.
B05D 7/00 (2006.01)
B05D 5/12 (2006.01)
C09K 11/02 (2006.01)
C09C 3/06 (2006.01)

(52) U.S. Cl.
CPC ............. *C09K 11/025* (2013.01); *C09C 3/063* (2013.01); *C01P 2004/61* (2013.01); *C01P 2004/84* (2013.01); *Y10S 977/773* (2013.01)

USPC .............................. 427/212; 427/58; 977/773

(58) Field of Classification Search
USPC ............ 427/58, 212, 157, 128, 160; 977/773
See application file for complete search history.

(56) References Cited

U.S. PATENT DOCUMENTS 2,885,366 A 5/1959 Iler
6,132,773 A 10/2000 Amiche
(Continued)

FOREIGN PATENT DOCUMENTS

EP 1 179 507 A1 2/2002
EP 1 548 071 A1 6/2005
(Continued)

OTHER PUBLICATIONS

Science Company, "Sodium Silicate Solution", 2013.*
(Continued)

*Primary Examiner* — Timothy Meeks
*Assistant Examiner* — Ann Disarro
(74) *Attorney, Agent, or Firm* — Workman Nydegger

(57) ABSTRACT

A method for producing solid particles having a silica coating, by: dispersing the solid particles to be coated in an aqueous medium to produce a solid particle dispersion, adjusting the pH of the solid particle dispersion by a buffer system to produce a buffered solid particle dispersion, and adding an alkaline silicate solution to the buffered solid particle dispersion to form the silica coating on the solid particles during a coating period. The amounts of buffer system and alkaline silicate solution are selected such that the pH of the buffered solid particle dispersion before the addition of the alkaline silicate solution is at least 7.0 and after completion of the addition of the alkaline silicate solution is at most 11.0.

14 Claims, 3 Drawing Sheets

(56) References Cited

U.S. PATENT DOCUMENTS

| | | | | |
|---|---|---|---|---|
| 6,387,532 | B1 * | 5/2002 | Atarashi et al. | 428/570 |
| 6,818,297 | B1 * | 11/2004 | Atarashi et al. | 428/403 |
| 2005/0287030 | A1 * | 12/2005 | Kishimoto et al. | 419/5 |

FOREIGN PATENT DOCUMENTS

| | | | |
|---|---|---|---|
| GB | 2 042 574 | A | 9/1980 |
| JP | 2001-64538 | A | 3/2001 |
| WO | 2006/030001 | A1 | 3/2006 |
| WO | 2006/072380 | A2 | 7/2006 |
| WO | 2009/036083 | * | 3/2009 |

OTHER PUBLICATIONS

International Search Report for PCT/EP2010/007264, Mar. 3, 2011 (3 pages).
IPRP and Written Opinion for PCT/EP2010/007264, Jul. 10, 2012 (6 pages).

* cited by examiner

FIG. 1
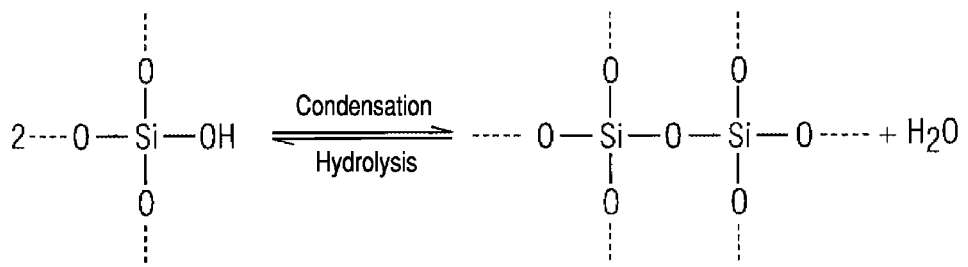
FIG. 2(a)   FIG. 2(b)   FIG. 2(c)
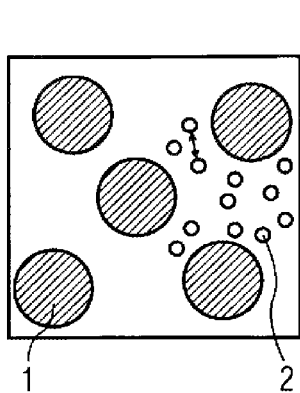 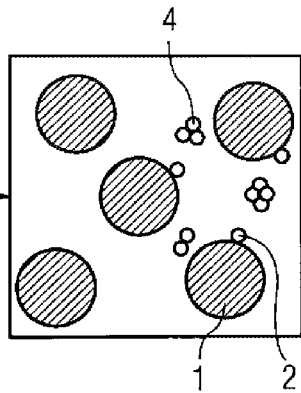 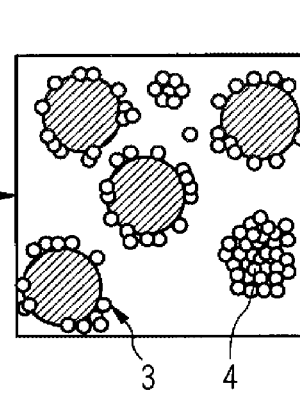
FIG. 3(a)   FIG. 3(b)   FIG. 3(c)
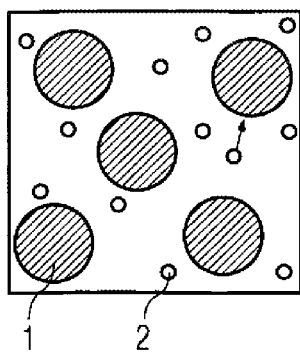 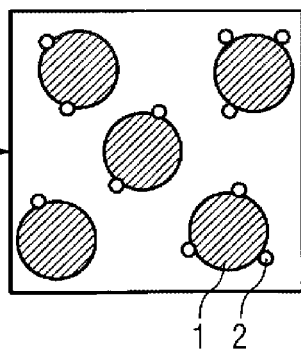 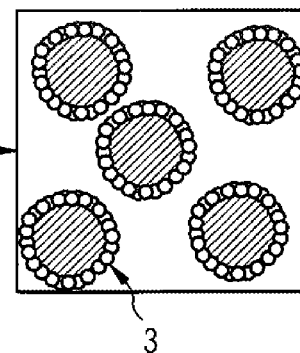

SOLID PARTICLES HAVING A SILICATE COATING

BACKGROUND OF THE INVENTION

A. Field of the Invention

The invention relates to a method for producing solid particles having a silica coating and for coating solid particles with silica. The method products thus have a core and a shell, whereby the shell has silica or consists of silica, while the core is a solid substance different from silica.

B. Related Art

The inventive method is in principle suitable for the silica coating of any desired solid particles. For example, there can be coated any desired inorganic solids stable under the process conditions of the coating method, in particular acid-labile substances, whereby the method according to the invention focusses on the protection of feature substances. The invention is described in the following with reference to acid-labile feature substances as the solid particles to be coated. The invention, however, is under no circumstances restricted to the coating of acid-labile feature substances with silica.

Documents of value, such as for example bank notes, shares, bonds, deeds, checks and other papers at risk of forgery, such as passports or other identification documents, are normally provided with various security features to increase their falsification security. Such a security feature typically has at least one feature substance. Such feature substances are for example luminescent, magnetic, electrically conductive or in certain wavelength ranges absorbing substances.

However, feature substances often exhibit the disadvantage of low stability toward external influences, such as for example oxygen, moisture, organic solvents and oxidizing or reducing substances. A further, serious problem is the sensitivity of many feature substances to acids.

There is a multiplicity of compounds which per se have physical properties which would render them excellently suitable as feature substances for documents of value. But unfortunately these physical properties, upon the actual employment in a document of value, change more or less quickly, as a result of which the check as to the authenticity of the document of value may lead to incorrect results. The decisive impediment, which makes it impossible for the feature substances to be used in documents of value, often is the sensitivity of the feature substances to acids. Documents of value, and in particular bank notes, very often come in contact with the human skin which has an acidic pH value between 5 and 6. Through the repeated contact with this acidic medium, there occurs in many feature substances a chemical change, which inevitably causes a change in the machine-readable or visually perceptible properties. Therefore, there have already been made attempts to suitably protect substances suitable as feature substances, which, however, cannot meet the high requirements for the resistance of their machine-readable or visually perceptible properties to external influences, in particular to the action of acidic media, which have to be met upon the use in documents of value.

In WO 2006/072380 it is proposed to provide an acid-labile feature substance with a shell consisting substantially of metal oxide. For forming the shell, either one or several feature substances and one or several metal oxide precursors are brought to reaction in a solvent under basic conditions at a pH value higher than 8, or one or several feature substances are dispersed in a solvent under basic conditions at a pH value higher than 8 and then one or several metal oxide precursors dissolved in a solvent are slowly added dropwise, or one or several feature substances and one or several metal oxide precursors are dispersed or dissolved in a solvent at a neutral or slightly basic pH value and then a base is slowly added dropwise. Suitable metal oxide precursors are metal organyl compounds, which through condensation reactions lead to the formation of the metal oxide of the shell. Through the kinetic control of the hydrolysis reaction via parameters such as pH, speed of dropwise addition and temperature there can be prevented an uncontrolled gel formation, which otherwise may lead to undesired agglomerates or extensive three-dimensional networks. As a by-product of the hydrolysis of the metal organyl compounds there may arise volatile organic compounds, which are of disadvantage with respect to the technical process.

From WO 2006/030001 there is known a method for producing a silica coating on particles, in which to a dispersion of the particles one adds simultaneously a solution containing silicate and an acid. In order to prevent agglomeration, the dispersion is acoustically excited, for example, by ultrasound.

Further methods for producing a silica coating on particles are known for example from U.S. Pat. No. 2,885,366, from GB 2 042 574 A and from U.S. Pat. No. 6,132,773.

In the method according to U.S. Pat. No. 2,885,366, by acidifying an alkali metal silicate "active silica" is produced and added to an aqueous suspension of the material to be coated. The acidification is preferably effected with sulphuric acid. In the method disclosed in GB 2 042 574 A in an aqueous dispersion of an inorganic pigment a silicasol is produced, by an alkali metal silicate as well as a compound being added, which compound is able to produce from the alkali metal silicate the silicasol. Such compounds are acid sources such as organic acids, phosphoric acids, borate ester, phosphate ester, alkali metal salts, ammonium salts, boric acid and ethylene carbonate. U.S. Pat. No. 6,132,773 discloses a method for coating particles with a silica shell, in which to the particles to be coated a silicate and an acid source is simultaneously added, whereby for increasing the ionic concentration and thus the silica deposition speed an electrolyte is added. As an acid source for example an inorganic acid, an organic acid or carbonic acid is used, and the electrolyte is an alkali metal salt.

Most of the above-mentioned methods have in common that a dispersion of the solid to be coated is provided, to which both a silicon dioxide precursor and an acid are simultaneously metered. This procedure has various disadvantages. For forming homogeneous, well covering layers with high acid resistance, the quantities of metered silicate and acid must be carefully balanced, i.e. a careful metering control and pH control is required. pH variations lead to irregularities in the silica nanoparticle growth, i.e. to size differences and agglomerations of the silica nanoparticles. In the worst case, the acid-labile feature substance can be dissolved or partially dissolved. Because at the place where the acid is dropwise added there is for a short time, until the intermixture with the surrounding solution, an acid excess, which is sufficient to partially destroy acid-labile features. Furthermore, by-products which arise from the dissolved or partially dissolved feature substance may lead to deviating feature signals, for example to additional luminescence bands in the case of luminous material, which upon authentication checks leads to falsified results, or be toxicologically critical. Furthermore, working with strong acids is not desirable with regard to occupational safety and health.

A comparatively good coating method is the method disclosed in WO 2006/072380 A2. However, it is not based on the acidification of basic silicon dioxide precursors on silicate basis, but on the basic hydrolysis of metalorganic metal oxide precursors. However, this method, too, requires a careful pH control and is susceptible to process instabilities with agglomeration problems resulting therefrom.

SUMMARY OF THE INVENTION

On these premises, the invention is based on the object to provide a method, improved compared to the prior art, for coating solid substances in powder form with a coating protecting against external influences, in particular against the action of acidic media. The method is to be suitable in particular for the coating of acid-labile feature substances.

The present invention is based on the basic idea to employ a buffer system as an acid source for the precipitation of silica from silicate solutions. The simultaneous, adjusted addition of an acid as a second metering component for neutralizing the basic silicate solution is at no time of the method required. Rather, a dispersion of the solid particles to be coated, which by means of a buffer system is set to be basic, is provided, and to this dispersion is metered merely a basic silicate solution. The acid character of the buffer system is used for the precipitation of the silica, whereby the pH value of the dispersion continuously and slowly increases in a strictly defined and controlled fashion corresponding to the changing equilibrium system of the buffer solution. Thus, sudden pH variations during the coating process and disadvantages resulting therefrom are avoided.

The present invention has been designed in particular, but not exclusively, for the protection of acid-labile feature substances. The acid stability of feature substances is judged with respect to the resistance of the physical properties of the feature substances upon the action of an acidic medium. As mentioned above, the feature substances, upon their use in documents of value, have to meet high requirements as to the resistance of their machine-readable or visually perceptible properties. Through the contact with an acidic medium, like human skin, there may occur a chemical change of the feature substances, which inevitably causes a change in the machine-readable or visually perceptible properties.

Thus "acid-labile feature substances" are understood to mean feature substances that change their machine-readable or visually perceptible physical properties upon the action of an acidic medium. Acid-labile feature substances coated according to the invention have an increased acid stability compared to the uncoated acid-labile feature substances, i.e. their machine-readable or visually perceptible physical properties preferably do not change upon the action of an acidic medium or only to such a small extent that a check of a certain physical property in the context of an authenticity check yields no falsified result. With regard to the definition of the terms "acid stability" and "acid lability" and their differentiation from each other, and with regard to suitable tests (bank note tests) for checking the acid stability, reference is made to the disclosure on the matter in WO 2006/072380.

With regard to the acid-labile feature substances or mixtures of acid-labile feature substances suitable for the coating, reference is also made to the WO 2006/072380 and the substances (acid-labile core) disclosed therein. However, it is once again expressly pointed out that the present invention is not only applicable to the protection of acid-labile feature substances against the action of acids. Rather, the coating method according to the invention is generally suitable for coating all poorly soluble inorganic solids. Some examples which, however, are not to be restrictive are oxides, in particular 3- and 4-valent oxides such as e.g. titanium oxide, aluminum oxide, iron oxide, boron oxide, yttrium oxide, ceric oxide, circonium oxide, bismuth oxide, as well as more complex oxides such as e.g. garnets, including among other things e.g. yttrium-iron garnets, yttrium-aluminum garnets, gadolinium-gallium garnet; perovskites, including among other things yttrium-aluminum perovskite, lanthanum-gallium perovskite; spinels, including among other things zinc-aluminum spinels, magnesium-aluminum spinels, manganese-iron spinels; or mixed oxides such as e.g. ITO (indium tin oxide);

oxyhalides and oxychalcogenides, in particular oxychlorides, such as e.g. yttrium oxychloride, lanthanum oxychloride; as well as oxysulphides, such as e.g. yttrium oxysulphide, gadolinium oxysulphide;

sulphides and other chalcogenides, e.g. zinc sulphide, cadmium sulphide, zinc selenite, cadmium selenite;

sulphates, in particular barium sulphate and strontium sulphate;

phosphates, in particular barium phosphate, strontium phosphate, calcium phosphate, yttrium phosphate, lanthanum phosphate, as well as more complex phosphate-based compounds such as e.g. apatites, including among other things calcium hydroxylapatites, calcium fluoroapatites, calcium chloroapatite; or spodiosites, including e.g. calcium fluorospodiosites, calcium chlorospodiosites;

metals, such as e.g. cobalt or nickel;

silicates and alumino silicates, in particular zeolites such as e.g. zeolite A, zeolite Y; zeolite-related compounds, such as e.g. sodalites; feldspars, such as e.g. alkali feldspars, plagioclases;

further inorganic compound classes such as e.g. vanadates, germanates, arsenates, niobates, tantalates.

Here, the mentioned inorganic solids, of course, can also be additionally doped, e.g. for the formation of a luminescent feature substance, with one or several elements, in particular with combinations of rare earths or with transition metals.

Besides inorganic solids, in principle, also any other desired solids and mixtures of solids, for example organic materials such as e.g. organic pigment particles, can be coated, provided that they are compatible with the process conditions, i.e. are poorly soluble in water, have a sufficient wettability, thermal stability and chemical stability in the pH range of the buffer system, and are inert to silica.

Furthermore, the coatings according to the invention protect not only against the action of acids, but against environmental influences of most different kinds. For example, through the coating according to the invention oxidation-sensitive solids can be protected against the action of atmospheric oxygen, solids sensitive to the action of certain solvents or other chemicals can be protected against the action of the respective solvents or chemicals, inflammable substances be protected against inflammation, or also the mechanical stability of brittle solid substances be improved. The coating method according to the invention is thus generally suitable for the stabilization of solid particles as well as for their protection against external influences.

In some solid particles it may be advantageous to improve the adhesion of the silica coating by prior treatment of the solid particles with an adhesion promoter. Suitable adhesion promoters are, for example, an amino-methoxy-functional compound (for example addid900 from Wacker Chemie) or APS (3-(2-aminoethylamino)propyl-trimethoxysilane) or KR44 from Wacker Chemie (isopropyl-tri(N-ethylenediamino)ethyl titanate). For the treatment with the adhesion promoter, preferably, the solid particles are first dispersed in a solvent and then the adhesion promoter is added. The adhesion promoters hydrolyze autocatalytically. After a first thin coating of the adhesion promoter has settled on the solid particles, the solid particles are ready for the coating method according to the invention to be carried out.

When the solid particles coated according to the invention are feature substances, there are certain restrictions with regard to the size of the initial solid particles (cores) and the finished coated solid particles (cores with shells of silica). The restrictions are due to the fact that the coated solid particles must be suitable for the introduction into the substrate of documents of value or for the application by means of printing method. The size of the cores therefore usually depends on the intended use.

Cores with a diameter which is between 1 μm and 50 μm, preferably between 1 μm and 20 μm, and particularly preferably about 10 μm, are suitable in particular for luminescent, magnetic and electrically conductive feature substances. Cores with a diameter greater than 1 μm are suitable for use in the screen printing method or for the introduction of the feature substances into the substrate of the paper of value at its production.

Cores with a diameter of less than 1 μm, particularly preferably less than 600 nm, are suitable for use in the ink-jet method.

The silica shells preferably have a thickness of 10 μm and less, particularly preferably 1 μm and less. This results in a diameter between 0.5 μm and 60 μm for the coated solid particles (core plus silica shell). Feature-substance particles preferably have a diameter between 1 μm and 20 μm. Preferably, 99% of all feature-substance particles have a particle diameter of less than 20 μm.

With the specified diameter ranges for the coated feature particles, all kinds of security elements, security papers and documents of value can be produced without problems.

Upon the coating method according to the invention, the solid particles are provided with a coating of silica. Silica is an amorphous form of silicon dioxide $SiO_2$.

DESCRIPTION OF THE DRAWINGS

FIG. 1 represents the condensation procedure;

FIGS. 2 and 3 respectively show the schematic deposition of silica nanoparticles 2 on solid particles 1 to be coated so as to form solid particles having silica coating 3;

FIG. 2a and FIG. 3a show the phase of the silica germ formation (nucleation), FIG. 2b and FIG. 3b show the phase of the layer growth, and FIG. 2c, and FIG. 3c show the respective end product, i.e. the coated solid particles;

DETAILED DESCRIPTION OF PREFERRED EMBODIMENTS

Figure 4:
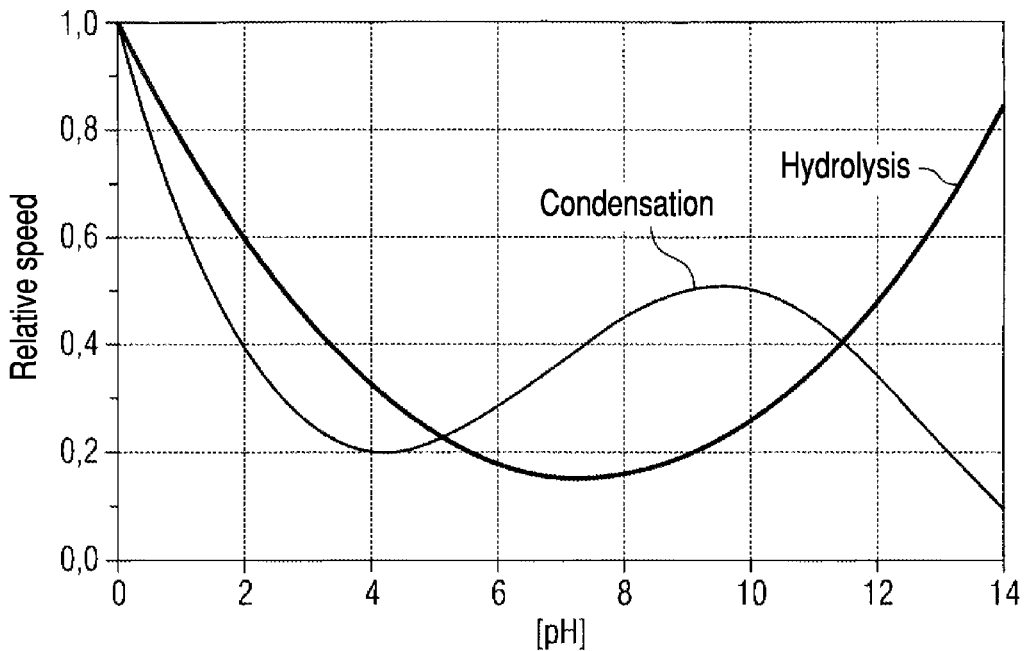
FIG. 4 shows the dependency of the condensation speed on the pH value.

Silica can be obtained in different ways and from different precursors. Upon the coating method according to the invention, it is precipitated from strongly basic solutions containing silicate. Suitable solutions containing silicate are sodium and potassium water glasses. The precipitation is effected by the fact that through a change of the pH value, for example by a targeted acidification of the silicate solution, a condensation of the dissolved silicate species is caused. The condensation procedure is represented in FIG. 1. Upon condensation, e.g. two silanol groups (Si—OH), which arise through the acidification of negatively metered silicate species (with Si—O⁻ groups), combine, with elimination of water. Alternative reaction pathways of the silicate condensation are described, for example, in the literature regarding sol-gel chemistry. So, through further condensation there arise silicate oligomers, which after further cross-linking lead to the formation of colloidal nanoparticles.

Depending on the pH value, concentration, temperature, etc, a certain quantity of silica in the form of silicates is soluble in a solution, i.e. no silica in the form of colloidal particles is precipitated. If now a parameter is changed, for example by acidifying or increasing the substance concentration, one exceeds the stable state and obtains an "oversaturated" solution. From the oversaturated solution there are initially formed very small nanoparticles (germs) of silica, as a result of which the oversaturation decreases, since through the precipitation of the solid silica the silicate concentration in the solution diminishes. This phase of the germ formation is the "nucleation".

Generally, the following applies: The higher the oversaturation, the more germs are formed and the quicker they are formed. Upon low oversaturation, the speed of the germ formation is lower, only a few germs are formed. The resulting germs then further grow through taking up surplus silicate from the solution. Since the germs compete with each other upon the taking up of silicate, a high number of germs ensures smaller particles, while a low germ number produces larger particles. Thus, there arises a direct influence of the pH value, which very strongly influences the oversaturation, and of the particle size of the resulting silica nanoparticles.

Where appropriate, this effect can be reinforced by pH dependent agglomeration of the silica nanoparticles among themselves. Likewise, a too high, sudden local oversaturation can lead to agglomeration, because too many particles arise in a limited space.

For the formation of an as homogeneous coating as possible of uniform thickness on the solid particles, it is advantageous to produce, upon uniform oversaturation, many small silica germs of an as equal size as possible and in a good distribution. Upon the method according to the invention, in which a basic silicate solution is not additionally acidified, but is directly metered to a buffer solution, there arise numerous small silica germs, since the buffer system, in comparison to a metered acid, such as HCl or $H_2SO_4$, makes available the hydrogen ions required for the formation of the silanol groups in a spatially very homogeneous and well-defined concentration. Germ formation, germ growth and the pH dependent agglomeration behavior of the silica nanoparticles are therefore in the total reaction volume very homogeneous, thereby obtaining non-agglomerated silica nanoparticles of uniform size. Upon metering an acid, however, there locally arises a strong pH gradient (e.g. very acidic at the place where the acid is introduced), and thus strongly inhomogeneous nucleation conditions.

Upon the formation of the silica coating on the feature substance particles or other solid particles there are three competing processes:

The agglomeration of solid particles and silica particles, which in the end leads to the coating of the solid particles with the silica particles,
  the agglomeration of silica particles to each other, which to a small extent is not disturbing, but is undesirable when leading to the formation of large agglomerates, and
  the agglomeration of solid particles to be coated to each other, which is also undesirable.

Upon the coating method according to the invention, the conditions are therefore chosen such that the agglomeration of solid particles to be coated and silica particles is promoted, while the two competing processes are suppressed.

A decisive factor here is the ionic concentration in the dispersion of the interrelated particles. Particles of the same kind have the same surface charge, for example a negative surface charge in the case of silica particles. They therefore electrostatically repel each other. If now positively charged ions are introduced into the solution or dispersion, these can shield the negative charge. This facilitates an approach of the particles, which upon collision can permanently agglomerate with each other. The cohesion of the particles after the collision can here for example be caused by short-range van-der-Waals forces. According to the invention, through the high buffer concentration, which is required to fully compensate the fed basic silicate solution, also a high ionic strength is produced in the reaction solution. This, therefore, makes it at the same time easier for the silica particles to be quickly deposited on the feature particles.

It is also known that increased temperatures favor a quick deposition. At higher temperatures, more successful collisions between the particles take place, upon which the electrostatically repelling forces between the particles could have been overcome. According to the invention, therefore a temperature of at least 60° C. is to be used, because otherwise, even when the basic silicate solution is added relatively slow, the deposition rate of the silica particles is so low that through the high concentrations of non-deposited free silica nanoparticles a strong agglomeration or a gelation of the solution is possible.

Here, attention has to be paid to the fact that agglomerates of large particles (in the μm-range) can relatively easily be separated by using shearing forces, while agglomerates of very small particles (in the nm-range) can only be separated with difficulties. Since a certain agglomeration of silica particles is not disturbing, the silica agglomerates, however, are to be in the nm-range, it is ensured according to the invention that the agglomeration of silica particles among themselves takes place only to a limited extent. Therefore, the dispersion of the solid particles to be coated is preferably kept in motion during the addition of the basic silicate solution to the solid-particle dispersion, for example by strongly stirring the solid-particle dispersion, so that there is always ensured a good intermixture of the solid particles to be coated and the silica particles which are formed and agglomerate to each other. A good intermixture effects that a homogeneous distribution of silica nanoparticles and solid particles to be coated is present, so that a few silica nanoparticles face a relatively large number of solid particles to be coated as "agglomeration partners". Without intermixture, locally there can be formed a relatively high number of silica nanoparticles, so that the probability of an undesired agglomeration of the silica nanoparticles among themselves increases. A slow addition of the basic silicate solution to the solid-particle dispersion over a longer time period, however, keeps the number of silica nanoparticles low, so that the agglomeration of silica particles onto solid particles to be coated is clearly preferred to the agglomeration of silica particles among themselves.

A good intermixture, in particular by using shearing forces, for example by suitable stirring tools producing shearing forces such as an Ultra-Turrax from the company IKA, furthermore ensures that the solid particles to be coated agglomerate only to a small extent, and, if larger agglomerates are formed, these agglomerates are again separated. This is due to the easy separability of agglomerates of particles in the μm-range. Silica nanoparticles adhering to the solid particles to be coated, however, due to their small size are not substantially separated from the solid particles to be coated.

The FIGS. 2 and 3 respectively show the schematic deposition of silica nanoparticles 2 on solid particles 1 to be coated so as to form solid particles having silica coating 3. FIG. 2a and FIG. 3a show the phase of the silica germ formation (nucleation), FIG. 2b and FIG. 3b show the phase of the layer growth, and FIG. 2c, and FIG. 3c show the respective end product, i.e. the coated solid particles. In FIG. 2 there is represented a deposition process, in which the agglomeration of silica particles to each other constitutes a favored process. Such a process course is obtained, when the basic silicate solution is added very quickly to the solid-particle dispersion and/or when the dispersion is not sufficiently intermixed during the coating process. In particular, such a process course is obtained, when acid is locally added for the precipitation of the silica particles. As indicated in FIG. 2a by the arrow, adjacent silica particles at a high local concentration can easily collide and in consequence be bound through short-range van-der-Waals forces to form silica agglomerates 4, which can no longer be separated. The silica-coated solid particles 3 have no uniform silica coating. Rather, on the surface of the solid particles there are agglomerates of silica particles, on the one hand, and uncoated, or less heavily coated or strongly inhomogeneously coated surface areas, on the other hand.

Unlike, the process course according to the invention in accordance with FIG. 3. Upon the method according to the invention, the silica particles are not precipitated through the addition of an acid, but through hydrogen ions from the buffer system of the solid-particle dispersion. Furthermore, the basic silicate solution is added during a longer time period to the buffered solid-particle dispersion, i.e. is metered within a few minutes, and the dispersion is at the same time strongly intermixed.

Thereby, the concentration of silica particles in the dispersion is kept low, and the formed silica particles 2 in particular are present in a well distributed fashion and in a good intermixture with the solid particles 1 to be coated. The attachment of the silica particles 2 to the solid particles 1 to be coated is therefore preferred to the agglomeration of the silica particles to each other, as indicated by the arrow in FIG. 3a. Gradually, more and more silica particles 2 attach themselves to the solid particles 1 (FIG. 3b). Finally, as a product there are formed silica-coated solid particles 3, which have a homogeneous and uniform coating of silica nanoparticles, without or at least substantially without uncoated solid-particles surface areas. By-products such as the silica agglomerates 4 shown in FIG. 2 are avoided.

The formed silica nanoparticles are oligomers of mutually condensed silicate species with an imprecisely defined degree of condensation and cross-linking, which have reached such a size that they become colloidal particles in the solution. The oligomer particles have sizes with diameters in the range of about 1 nm to 10 nm. The oligomer primary particles can, to a certain extent, agglomerate to somewhat larger silica nanoparticles, whereby the diameters of the formed silica nanoparticles preferably do not exceed 100 nm.

Also the pH value of the coating system has a great influence on the coating process. To permit the silica particles to be precipitated from basic silica solutions, acid of any form must be made available. The reaction course of the silica formation, however, strongly depends on the pH value. E.g. the hydrolysis of existing [Si—O—Si] bonds can both take place in a basic and acidic catalyzed fashion, the speed of this reaction is therefore the quickest respectively in the strongly basic and strongly acidic. A more complex connection arises upon the dependency of the condensation speed, and thus the formation speed of the silica nanoparticles, on the pH value. As represented in FIG. 4, it takes place slowly in the slightly acidic pH range as well as in the strongly basic pH range, but quickly in the weakly to moderately basic range and in the strongly acidic range.

A condensation speed useful for a coating process is in a pH range between 7 and 11. At a pH value of 7, however, the hydroxide concentration is very low, the oversaturation and germ formation therefore low, as a result of which the silica germs become disadvantageously large. Likewise, the solubility of silica increases with the pH value, from a pH value of 11 upwards significant portions of the silica are therefore present in a dissolved fashion.

Therefore, the basic pH range of 8 to 11 is preferably used according to the invention. The pH range in which the condensation speed, and thus the germ formation rate, is the highest, is the pH range between 8.5 and 10.5. In this range, a large number of small silica germs is quickly formed in an advantageous way. Therefore, according to the invention, the pH value of the solid particle dispersion is preferably set to 8.5 to 10.5.

It is an essential feature of the present invention that the pH value of the reaction dispersion, i.e. the solid-particle dispersion to which the basic silicate solution is added, is kept in a narrow pH range during the entire addition of the basic silicate component by means of a suitable buffer system.

A buffer system is a combination of an acid (HA) and the corresponding base (A$^-$), the mixture thereof being able to stabilize the pH value of a solution in a narrow range around a certain value. Changes in the pH value are attenuated here, through either protons being given off by the acid HA or being taken up by the base A$^-$.

In an unbuffered system, the addition of a strong acid (e.g. HCl) even in small quantities leads to a sudden change of the pH value. In a buffered system, the protons given off by the strong acid are taken up by the buffer base (A$^-$), which thereby becomes a (weak) buffer acid (HA) and thus binds the protons. This applies analogously to the addition of a strong base (e.g. NaOH), whose hydroxide ions withdraw protons from the buffer acid. The change of the pH value in a buffered system can be approximately stated via the Henderson-Hasselbalch equation, whereby the so-called $pK_s$ value is a specific constant for the type of the buffer:

$$pH = pK_s - lg\frac{c(HA)}{c(A^-)}$$

If c (HA) and c (A$^-$) are equal, there applies pH=$pK_s$ ("buffer point"). Even if through the addition of strong acids or strong bases one buffer component is used up to such an extent that the two buffer components now are in a ratio of 10:1, through the logarithmic connection there results only a pH change of ±1.

For the purposes of the present invention, a buffer system should be selected, whose $pK_s$ value numerically lies in the range of the upper limit of the pH value range optimal for the silica deposition on the solid particles to be coated, i.e. the $pK_s$ value should advantageously be approximately between 10 and 11. This makes it possible for the buffer acid to be provided in great excess, in relation to the buffer base, and still be in the range of the optimum pH values. Upon buffer systems with a $pK_s$ value near the lower limit of the range of optimum pH values, i.e. the $pK_s$ value lies between 7-8, buffer acid and buffer base should be present, however, at least in equal parts, since otherwise the pH value, during the initial stage of the process, lies outside the range optimal for the coating. Suitable buffer systems with $pK_s$ values between 7-11 are for example the systems potassium hydrogen carbonate/potassium carbonate, sodium hydrogen carbonate/sodium carbonate, potassium dihydrogen phosphate/potassium hydrogen phosphate, sodium dihydrogen phosphate/sodium hydrogen phosphate, potassium hydrogen sulphite/potassium sulphite and sodium hydrogen sulphite/sodium sulphite. Of course, mixtures of several buffer systems in different quantities and with different relative ratios of the individual buffer components can also be used, in order to specifically control the exact course of the pH value during the coating. The buffer system potassium hydrogen carbonate/potassium carbonate with a $pK_s$ value of about 10.3 is particularly preferred.

The buffer system and its function is described in the following with reference to the system potassium hydrogen carbonate/potassium carbonate, and with potassium water glass as a basic silicate solution. It is obvious, that for other buffer systems and other basic silicate solutions, such as sodium water glass, the same applies analogously.

Upon the coating method according to the invention, the solid particles to be coated are provided as a dispersion in a buffer solution. The potassium water glass is metered to this buffered dispersion. Here, an excess of potassium hydrogen carbonate is used to keep, upon the precipitation of the $SiO_2$ from the metered potassium water glass through the protons of the potassium hydrogen carbonate, the pH value in a range optimal for the formation of silica nanoparticles below the buffer point (preferably at a pH value of about 8 to 10).

Figure 5:
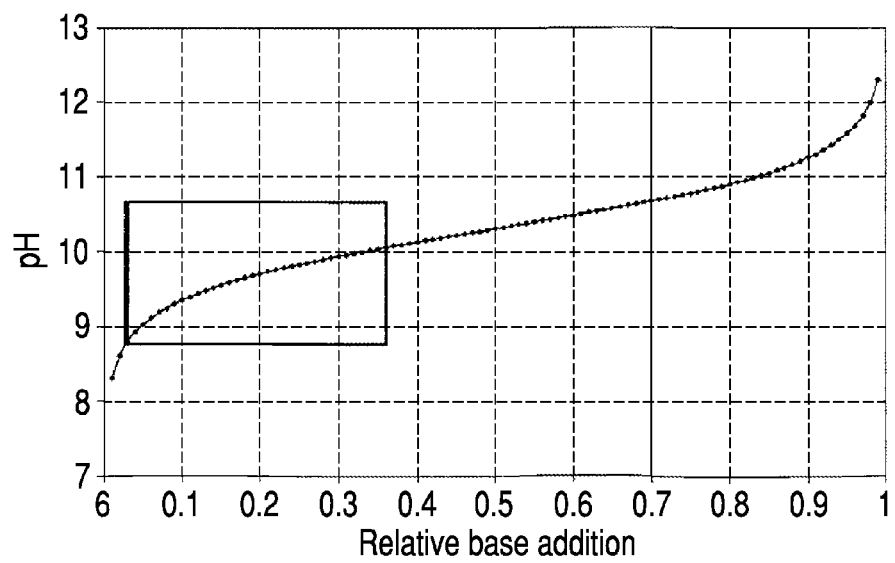
FIG. 5 shows a controlled pH course during a coating process.

FIG. 5 shows by way of example a controlled pH course during a coating process for solid particles according to the invention. On the abscissa the base addition is stated, i.e. the addition of potassium water glass, in relative units, and on the ordinate the associated pH value is stated. According to the invention, one preferably works within the small marked-off box. Accordingly, the quantities of buffer system and basic silicate solution are adjusted to each other such that upon reaching the right margin of the marked-off box (relative base addition about 0.37), the entire basic silicate solution required for the coating has been added. Before starting the addition of the basic silicate solution, the pH value of the buffer is set to a desired starting point, in the case shown at pH=8.75. In the course of the coating process, the pH value slowly and continuously moves up to 10. The curve shape is determined substantially by the provided buffer quantity, the starting point substantially by the ratio of the buffer components to each other, and the endpoint by the quantity of the totally metered basic silicate solution.

The, according to the invention, preferably employed basic silicate solutions are potassium water glass and sodium water glass. Potassium water glass and sodium water glass are terms for glassy, water-soluble potassium silicates and sodium silicates or their viscous aqueous solutions. The water glasses have no defined stoichiometry, so that they usually are characterized by the mass ratio or the mol ratio $SiO_2$/alkali oxide as well as by the density of the aqueous solution. As the composition may vary depending on the manufacturer and batch, it is necessary to know for each batch the base content ("KOH") and the content of dissolved silica ("$SiO_2$"), in order to ensure a reproducible process.

For the precipitation of the $SiO_2$ content contained in the potassium water glass as dissolved silicate, the KOH content must be neutralized. The quantity of hydrogen carbonate to be employed in the coating process according to the invention therefore depends on the KOH content of the employed potassium water glass. For this, there can be changed the ratio of buffer acid and buffer base of the buffer system, on the one hand, as a result of which, however, also the pH course during the coating undergoes a change. E.g. upon an increased KOH content, there can be chosen a higher content of buffer acid in the buffer system, as a result of which the pH value is lower at the beginning of the coating reaction. Alternatively, the buffer quantity can be adjusted at a constant ratio of buffer acid and buffer base, whereby the pH course remains approximately constant even after the adjustment to different KOH contents.

Preferably, the buffer system is set such that one equivalent hydroxide in the basic silicate solution faces 1 to 4 molar equivalents, particularly preferably 3 molar equivalents, of buffer acid. Upon a buffer system of potassium hydrogen carbonate/potassium carbonate and potassium water glass as basic silicate solution, the employed quantity of potassium hydrogen carbonate therefore preferably corresponds to 1 to 4 molar equivalents, particularly preferably 3 molar equivalents, of the KOH quantity of the potassium water glass.

Setting the buffer mixture to a suitable initial pH value is effected for example by dissolving suitable quantities of the individual components of the buffer system, in the case of the buffer system of potassium hydrogen carbonate/potassium carbonate, this means, of potassium hydrogen carbonate and potassium carbonate in water. Alternatively, the buffer acid can be treated with suitable quantities of a base, or the buffer base with suitable quantities of an acid, e.g. when potassium hydrogen carbonate is provided, by adding potassium hydroxide solution. In a preferred embodiment, setting the buffer mixture to a suitable initial pH value is automatically effected upon heating a solid-particle dispersion in a potassium-hydrogen-carbonate solution.

Upon employing potassium hydrogen carbonate, through the heating (above 50° C.) of the solution or dispersion, small amounts of the potassium hydrogen carbonate decompose to potassium hydroxide and carbon dioxide, whereby, through further reaction of the potassium hydroxide with hydrogen carbonate, there arises free carbonate. The result is here an initial buffer mixture of hydrogen carbonate/carbonate with an advantageous pH value of about 8.5.

Of course, altogether, there must be provided a sufficient quantity of the buffer system, so that during the entire coating process sufficient buffer acid is available, in order to precipitate from the added quantity of basic silicate solution the silica required for the coating and to remain at the same time within the pH range of 7-11 optimal for the coating.

So as to ensure optimum conditions for the silica-layer formation on the feature-substance particles or other solid particles to be coated, the coating method according to the invention is preferably carried out as follows:

First, the solid to be coated, in powder form, is dispersed in an aqueous medium, preferably in water, and the pH value of the dispersion is set to an initial value of at least 7.0 with a suitable buffer system, preferably with potassium hydrogen carbonate/potassium carbonate. Alternatively, first, a buffer solution with the appropriate pH value can be produced and the solid-particle powder be dispersed therein. Preferably, per 100 g solid particles 500 to 1.000 ml of water are employed. The quantity and precise composition of the buffer system is dependent on the quantity and composition of the basic silicate solution which is employed for the coating of the solid particles. Preferably, as a basic silicate solution there is employed a potassium-water-glass solution optionally diluted with water before the coating reaction, which contains 10 g/l to 360 g/l $SiO_2$ as well as 5 g/l to 280 g/l KOH. Particularly preferred concentrations are 60 g/l to 200 g/l $SiO_2$ and 30 g/l up to 150 g/l KOH, and even more particularly preferably 80 g/l $SiO_2$ and 40 g/l KOH. Instead of KOH the basic silicate solution can of course also contain an equivalent amount of NaOH or a different hydroxide or different base. Here, it must be taken into account that different bases and their reaction products may have different solubilities, so that the employed concentrations must be respectively adjusted to the solubility in order to obtain a solution.

Since the buffer system is the only acid source for the precipitation of silica from the basic silicate solution, a quantity of buffer sufficient for the precipitation of the desired quantity of silica must be made available. In relation to a certain hydroxide quantity in the basic silicate solution, 1 to 4 molar equivalents, preferably 3 molar equivalents, of buffer acid should be available. The appropriate buffer composition can be set, for example, through the addition of acid or base, or through a suitable mixing of the individual buffer components. When choosing the quantity and composition of the buffer system there should also be taken into account that the pH value after the completion of the addition of the basic silicate solution may amount to maximally 11.0. At higher pH values the solubility of the silica is too high, and the formation of silica from the added water-glass solution is only possible to a limited extent or no longer possible. Preferably, the buffer solution is provided in such a quantity and composition, that the pH value at the beginning of the coating process is at least 8.0, since upon pH values below 8.0 the speed of germ formation is low and quite large silica germs are formed. According to a particularly preferred embodiment, the buffer solution is provided in such a quantity and composition that the pH value at the beginning of the coating process is about 8.5 and at the end of the coating process about 10.5.

The dispersion of solid particles in buffer solution is strongly stirred preferably under the action of shearing forces, in order to prevent an undesired agglomeration of the particles to be coated as well as of the formed silica particles respectively to each other and in order to ensure a good intermixture of silica particles and solid particles to be coated. In this way, the attachment of silica particles to the surface of the particles to be coated is promoted.

It is further preferred to heat the buffered solid-particle dispersion, preferably to a temperature of 60 to 90 degrees Celsius, particular preferably to 70 to 90 degrees Celsius, and in particular to 70 to 80 degrees Celsius. By the heating, the deposition rate of the silica nanoparticles on the feature particles is favored.

To the buffered solid-particle dispersion there is now added the basic silicate solution. The addition is effected with a speed that both takes into account the content of $SiO_2$ in the basic silicate solution and the surface of the solid particles to be coated. Preferably, the basic silicate solution is metered with a speed which corresponds to 0.08 g to 1.6 g $SiO_2$ per $m^2$ of solid-particle surface per hour (0.08 g to 1.6 g $SiO_2$ $m^{-2}h^{-1}$), preferably 0.3 to 1.2 g $SiO_2$ $m^{-2}h^{-1}$, particularly preferably 0.6 g $SiO_2$ $m^{-2}h^{-1}$. In this way it is ensured that there is always formed a sufficient number of silica nanoparticles through condensation, and that these formed silica nanoparticles can also be sufficiently well intermixed with the solid particles to be coated in order to prevent silica agglomerates, and to favor an attachment to the solid particles to be coated, and to form a substantially homogeneous layer on the solid-particle surfaces. In total, per 1 $m^2$ solid-particle surface to be coated there is added a quantity of basic silicate solution which contains about 0.8 to 3.5 g $SiO_2$, preferably 1.2 to 2.8 g $SiO_2$, and particularly preferably 2 g $SiO_2$. So, on the surfaces of the solid particles to be coated there is formed a silica coating which substantially completely envelopes the solid particles, as it is shown in the cross-section of the coated solid particles 3 in FIG. 3c.

Preferably, during the entire coating time the temperature is maintained at the previously set increased value and the solid-particle dispersion dispersed. When the coating is completed, the coated solid particles are separated from the dispersion, for example by filtration, and dried. If particles through the filtration or drying step have strongly agglomerated among themselves, or if through pressing the wet powder a strong compaction has occurred, an aftertreatment can be carried out for separating the particles or loosing up the compacted dried powder.

Immediately after the coating, the acid protection of the silica layer is still low or not present. A strong acid protection arises only through an aftertreatment of the powder in an annealing step. According to a preferred embodiment, the silica-coated solid particles are annealed at a temperature of 150 degrees Celsius. The "freshly deposited" silica layer namely consists of individual silica nanoparticles, which only adhere to each other by cohesion forces, whereby a permeable sphere layer structure arises, and, moreover, in some cases there may also be individual gaps through voids between the silica nanoparticles, at which the solid-particle surface is better accessible. Through an annealing process at sufficiently high temperature, however, any gaps can be closed and the individual silica particles be chemically combined. The chemical combining again is effected by the condensation of the silanol groups on the surfaces of the silica nanoparticles. Final product is then a particle having a relatively closed silica network, whereby the permeability of the layer, for e.g. acids, is strongly reduced.

Figure 6:
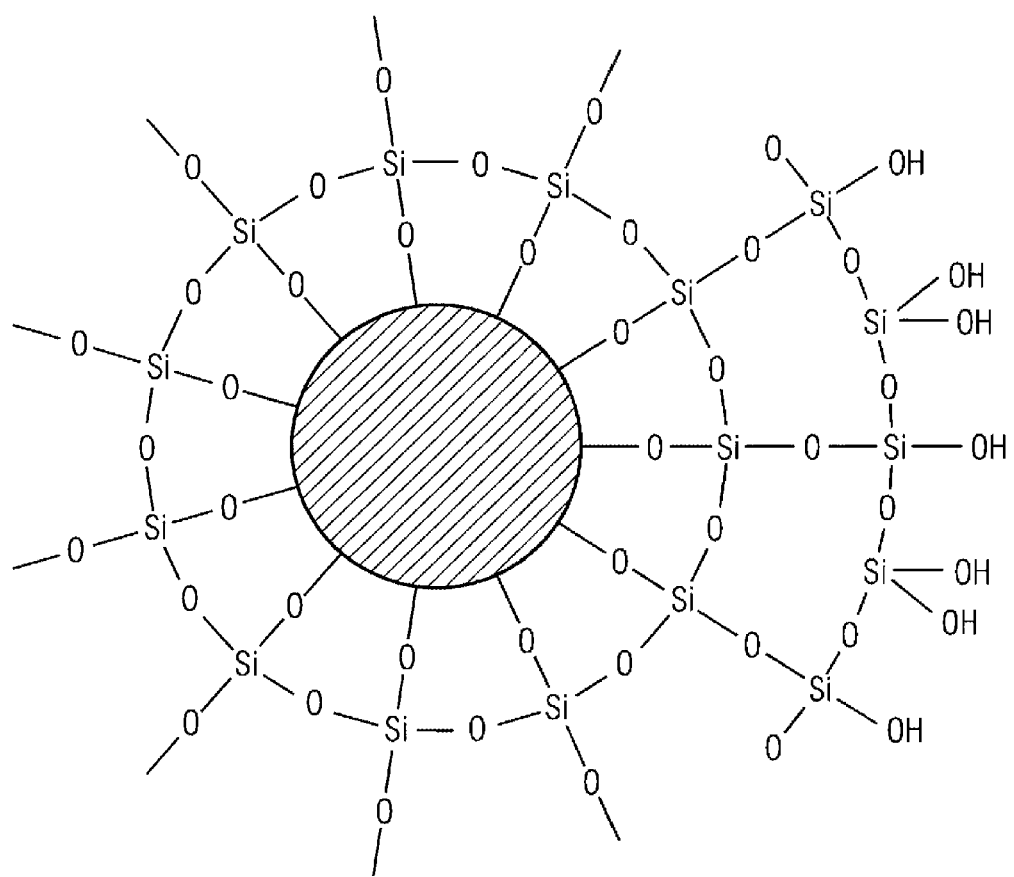
FIG. 6 depicts oxygen bridges connecting silica particles in the annealed coating.

During the annealing the silanol groups on the surfaces of adjacent silica particles mutually condense, so that the silica particles of the coating to a more or less strong extent are chemically combined via oxygen bridges as shown in FIG. 6. Upon full condensation of all silanol groups there would be formed a continuous layer of a network of silicon atoms linked via oxygen atoms, which layer would fully envelop the solid particle to be coated. In reality, even through the annealing there is not formed such a continuous three-dimensional shell, but a sufficient number of chemical bonds is made between the silica nanoparticles in order to ensure a permanent adhesion of the silica nanoparticles of the coating to each other, and to reduce, to close, or to make inaccessible gaps or spaces between the individual nanoparticles by sintering processes.

Particularly preferred annealing conditions are 12 hours at 150° C. with a heating rate of 5 degrees Celsius/min as well as, alternatively, four hours at 250 degrees Celsius or 2 hours at 300 degrees Celsius, preferably also with a heating rate of 5 degrees Celsius/min.

In the following an embodiment is described:

A temperature-controlled reactor of glass equipped with a thermostat, an Ultra-Turrax T50 from the company IKA with a Turrax head G45M, a flow inducer from the company Ismatek and a balance from Sartorius (for controlling the flow rate of the potassium water glass via the weight) was filled with 245 g distilled water and 43.5 g of potassium hydrogen carbonate from Sigma Aldrich (technical quality, 98%) dissolved therein. The solution was brought to a temperature of 70 to 80 degrees Celsius. Then, 32 g of an inorganic feature substance powder to be coated with a surface of 7.7 m² were added and dispersed for one minute with the Ultra-Turrax for producing a dispersion. Then 210 g of a potassium water glass solution, diluted with distilled water before, with a $SiO_2$ content of 80 g/L and a KOH content of 40 g/L was continuously metered in the course of 30 minutes using a pump. During the entire duration of the metering, the temperature of the dispersion was maintained at 70 to 80 degrees Celsius, and the Ultra-Turrax continued to be working. After the end of the metering, the dispersion was filtered, washed with 500 mL of water and annealed in the oven for 2 h at 300° C. with a heating rate of 5° C. per minute. There were obtained 50 g of coated product.

The method according to the invention for producing solid particles having a silica coating, wherein a buffer system serves as the sole acid source for the precipitation of silica nanoparticles, has a number of advantages compared to methods of the prior art, wherein for the precipitation of silica, acid is separately added. So, upon the one-pot method according to the invention, no metering control for the balancing of metered silicate and metered acid is required, and also the pH control is omitted, since the buffer system as the only acid source ensures a self-regulating "perfect" pH course. Also upon variations in the addition speed of the basic silicate solution, no noticeable pH variations occur, which leads to improved product properties. Undesired agglomerations and size differences in the silica nanoparticles, which are a result of pH variations, can be prevented in the method according to the invention. Furthermore, the employed pH range and its course during the coating can be set very precisely through a targeted choice of the buffer composition and buffer quantity.

Upon the coating of acid-labile solids, such as acid-labile feature substances, the method according to the invention has the additional advantage that, in contrast to methods of the prior art with direct acid metering, there occurs no partial destruction of the acid-labile solid substances. In methods of the prior art with direct acid metering, at the place where the acid is dropwise added there occurs for a short time, until the sufficient intermixture with the surrounding solution, an acid excess which damages acid-sensitive solids. This is a problem in particular with acid-labile feature substances, since the feature substances often are very costly, on the one hand, and since by-products which arise from the dissolved or attacked feature substance may lead to deviating feature signals, for example additional luminescence bands in the case of luminescence substances, or may be toxicologically critical, one the other hand.

The method according to the invention has been designed in particular for the silica coating of acid-labile feature substances for security features. Feature substances coated according to the invention are optimally suitable for the production of security features for use in bank notes. For this purpose of use it is necessary that larger agglomerations are avoided which can arise for example through the sintering together of feature-substance particles and large silica agglomerates, i.e. the particle sizes of the final product must be under 20 μm. Moreover, the coated feature substances must have a long-term acid resistance and a "mechanical stability", i.e. the silica layer must be very dense and homogeneous and also withstand a strong mechanical stress. Here, again, inhomogeneously coated particles or particles sintered together with silica agglomerates are disadvantageous, since, here, upon mechanical stress the silica shell may break off more easily or the agglomerates may break up more easily and so the unprotected feature surface is uncovered. These requirements are met by silica coatings produced according to the invention. Feature substances coated according to the invention thus achieve high acid stabilities, even after they have been mechanically loaded, e.g. by grinding in an ultracentrifugal mill. In spite of this specific suitability and optimization for the stated purpose of use, the method according to the invention can, of course, also be advantageously used for the coating of other solid particles for other purposes of use.

The invention claimed is:

1. A method for producing solid particles having a silica coating which are suitable as feature substances to increase the falsification security of documents of value, wherein the silica-coated solid particles have diameters in the range of 0.5 µm to 60 µm and the silica coating has a thickness in the range of 100 nm to 10 µm, the method comprising the steps:

producing a buffered solid-particle dispersion by:
dispersing acid-labile solid particles to be coated in an aqueous medium to produce a solid-particle dispersion, and setting the pH value of the solid-particle dispersion by a buffer system; or
dissolving a buffer system in an aqueous medium to produce a buffer solution having a pH value, and dispersing the acid-labile solid particles to be coated in the buffer solution; and adding a basic silicate solution to the buffered solid-particle dispersion to form the silica coating on the solid particles during a coating time, wherein the buffer system is selected from the group consisting of potassium hydrogen carbonate/potassium carbonate, sodium hydrogen carbonate/sodium carbonate, and mixtures thereof, the composition and the quantities of the buffer system and of the basic silicate solution are selected such that the pH value of the solid-particle dispersion, before the addition of the basic silicate solution, is at least 8.5, and after the completion of the addition of the basic silicate solution is at most 10.5.

2. The method according to claim 1, wherein the addition of the basic silicate solution to the buffered solid-particle dispersion is carried out by mixing with the simultaneous presence of shearing forces of the buffered solid-particle dispersion.

3. The method according to claim 1, wherein the temperature of the buffered solid-particle dispersion, before the addition of the basic silicate solution, is set to 60 to 90° C. and is maintained during the coating time of the solid particles.

4. The method according to claim 1, wherein the basic silicate solution comprises potassium water glass or sodium water glass.

5. The method according to claim 1, wherein the basic silicate solution contains:
10 g/L to 360 g/L $SiO_2$; and
5 g/L to 280 g/L, KOH or a quantity of NaOH or of a different base.

6. The method according to claim 1, wherein the buffer system has a content of buffer acid corresponding to 1 to 4 molar equivalents, with respect to 1 equivalent hydroxide in the basic silicate solution.

7. The method according to claim 1, wherein per 1 $m^2$ surface of the solid particles to be coated, the basic silicate solution contains 0.8 to 3.5 g $SiO_2$.

8. The method according to claim 1, wherein for producing the buffered solid-particle dispersion, for each 100 g of solid particles, 500 to 1000 ml water are used.

9. The method according to claim 1, wherein the basic silicate solution is added to the buffered solid-particle dispersion at a rate which corresponds to 0.08 g to 1.6 g $SiO_2$ per $m^2$ solid-particle surface per hour (0.08 g to 1.6 g $SiO_2$ $m^{-2}h^{-1}$).

10. The method according to claim 1, wherein the acid-labile solid particles comprise acid-labile feature substances comprising one or more of:
one or more luminescent substances with characteristic luminescence properties;
one or more magnetic substances;
one or more electrically conductive substances; and
one or more substances absorbing specifically in the infrared wavelength range.

11. The method according to claim 1, wherein after the end of the coating time, the silica-coated solid particles are separated from the buffered solid-particle dispersion, dried and annealed, said step of annealing being effected at a temperature in the range of 150° C. to 350° C., and for a period of at least 1 hour.

12. The method according to claim 11, wherein the silica-coated solid particles are annealed at 150° C. for 12 hours or are annealed at 250° C. for 4 hours or are annealed at 300° C. for 2 hours, and wherein the heating is effected at a rate of 5° C./min up to 150° C. or 250° C. or 300° C.

13. The method according to claim 1, wherein on the solid particles to be coated, there is formed a shell of silica nanoparticles, wherein the silica nanoparticles have diameters in the range of 1 nm to 100 nm.

14. The method according to claim 13, further comprising at least partly condensing the silica nanoparticles so as to form a three-dimensional network which substantially gaplessly encloses the solid particles to be coated.

* * * * *